US012601467B2

(12) United States Patent
You et al.

(10) Patent No.: US 12,601,467 B2
(45) Date of Patent: Apr. 14, 2026

(54) LIGHTING APPARATUS

(71) Applicant: LEEDARSON LIGHTING CO., LTD., Zhangzhou (CN)

(72) Inventors: Yuankai You, Zhangzhou (CN); Weiwei Lin, Zhangzhou (CN)

(73) Assignee: LEEDARSON LIGHTING CO., LTD., Zhangzhou (CN)

( * ) Notice: Subject to any disclaimer, the term of this patent is extended or adjusted under 35 U.S.C. 154(b) by 0 days.

(21) Appl. No.: 18/823,327

(22) Filed: Sep. 3, 2024

(65) Prior Publication Data

US 2025/0075888 A1 Mar. 6, 2025

(30) Foreign Application Priority Data

Sep. 4, 2023 (CN) ......................... 202322387653.7

(51) Int. Cl.

| | |
|---|---|
| ***F21V 19/00*** | (2006.01) |
| ***F21V 3/06*** | (2018.01) |
| ***F21V 15/01*** | (2006.01) |
| ***F21V 17/06*** | (2006.01) |
| ***F21V 17/16*** | (2006.01) |
| ***F21V 29/89*** | (2015.01) |
| ***F21Y 115/10*** | (2016.01) |

(52) U.S. Cl.

CPC ............ *F21V 19/004* (2013.01); *F21V 3/062* (2018.02); *F21V 15/01* (2013.01); *F21V 17/06* (2013.01); *F21V 17/16* (2013.01); *F21V 29/89* (2015.01); *F21Y 2115/10* (2016.08)

(58) Field of Classification Search

CPC ........ F21V 19/004; F21V 3/062; F21V 15/01; F21V 17/06; F21V 17/16; F21V 29/89; F21V 5/04; F21V 14/06; F21Y 2115/10; F21K 9/233; F21K 9/238

See application file for complete search history.

(56) References Cited

U.S. PATENT DOCUMENTS

| | | | | |
|---|---|---|---|---|
| 7,872,278 B2 * | 1/2011 | Stoyan | F21V 19/004 257/434 |
| 10,260,702 B2 * | 4/2019 | Lee | G02B 19/0061 |
| 2010/0164348 A1 * | 7/2010 | Huang | F21K 9/23 313/46 |
| 2011/0074289 A1 * | 3/2011 | Van de Ven | F21K 9/233 315/32 |
| 2012/0262932 A1 * | 10/2012 | Lu | F21V 19/004 362/396 |

(Continued)

*Primary Examiner* — Tsion Tumebo

(74) *Attorney, Agent, or Firm* — LANWAY IPR SERVICES; Chun-Ming Shih

(57) ABSTRACT

A lighting apparatus includes a plastic cover, a trumpet housing and a light source plate. The plastic cover has an edge portion, a light passing cover and a connection column. The trumpet housing has a widened section and a neck portion. A top end of the neck portion is coupled to a bottom end of the widened section. A diameter of the widened section increases through a tapered transition from the bottom end of the widened section to a top end of the widened section. A light source plate is mounted with a LED module on a front surface. The light source plate is fixed to an inner structure of trumpet housing. The connection column engages the front surface of the light source plate. The edge portion of the plastic engages the top end of the widen section of the trumpet housing.

17 Claims, 9 Drawing Sheets

(56) References Cited

U.S. PATENT DOCUMENTS

| | | | | |
|---|---|---|---|---|
| 2013/0114251 | A1 * | 5/2013 | Duan | F21V 29/78<br>29/830 |
| 2015/0003072 | A1 * | 1/2015 | Chen | F21K 9/23<br>362/294 |
| 2015/0241033 | A1 * | 8/2015 | Kurita | F21K 9/233<br>362/311.14 |
| 2016/0290605 | A1 * | 10/2016 | Haskal | F21V 3/02 |
| 2017/0146199 | A1 * | 5/2017 | Weng | F21K 9/238 |
| 2018/0216801 | A1 * | 8/2018 | Thiele | F21V 19/004 |
| 2021/0108781 | A1 * | 4/2021 | Peng | F21V 17/164 |

* cited by examiner

LIGHTING APPARATUS

FIELD

The present invention is related to a lighting apparatus, and more particularly related to a lighting apparatus with a convenient assembly structure.

BACKGROUND

LED (Light Emitting Diode) technology has undergone significant development since its inception in the early 20th century. The first practical LED was developed in 1962 by Nick Holonyak Jr., a scientist at General Electric. Initially, LEDs were limited to emitting low-intensity red light and were used primarily as indicator lights in electronic devices. These early LEDs were inefficient and expensive, which restricted their applications. However, the fundamental principle of electroluminescence, where materials emit light in response to an electric current, laid the groundwork for future advancements.

Throughout the 1970s and 1980s, improvements in materials and manufacturing techniques led to the development of LEDs that could emit light in different colors, including green and yellow. These advancements were driven by the discovery and utilization of new semiconductor materials like gallium phosphide and gallium arsenide. Concurrently, researchers worked on enhancing the efficiency and brightness of LEDs, making them more suitable for practical applications. By the late 1980s, LEDs were being used in digital displays, traffic lights, and signage, though they were still not efficient enough for widespread lighting applications.

The breakthrough that revolutionized LED technology came in the 1990s with the development of blue LEDs by Shuji Nakamura and his colleagues. Using gallium nitride (GaN) and indium gallium nitride (InGaN) as the semiconductor materials, they were able to create high-brightness blue LEDs. This innovation was crucial because it enabled the creation of white light LEDs by combining blue LEDs with phosphors that convert blue light to white light. This breakthrough not only expanded the range of applications for LEDs but also paved the way for their use in general lighting.

As the 21st century progressed, LED technology continued to evolve rapidly. Advances in materials science, particularly the development of more efficient phosphors and quantum dot technologies, have significantly improved the color rendering and efficiency of LEDs. Additionally, improvements in manufacturing processes, such as the development of epitaxial growth techniques and surface coating technologies, have reduced production costs and increased the durability of LEDs. These enhancements have made LEDs the preferred choice for a wide range of applications, from residential and commercial lighting to automotive and outdoor lighting.

Today, LED technology is at the forefront of the lighting industry, driven by its energy efficiency, long lifespan, and versatility. LEDs consume significantly less energy compared to traditional incandescent and fluorescent bulbs, resulting in lower electricity bills and reduced environmental impact. Their long operational life, often exceeding 50,000 hours, reduces the need for frequent replacements, further contributing to their cost-effectiveness and sustainability. The versatility of LEDs allows for innovative lighting solutions, including smart lighting systems that can be controlled remotely and integrated into smart home ecosystems.

Looking ahead, the future of LED technology is promising, with ongoing research focusing on enhancing efficiency, reducing costs, and expanding applications. Emerging technologies such as organic LEDs (OLEDs) and micro-LEDs are poised to further transform the lighting and display industries. OLEDs, known for their flexibility and ability to produce high-quality, vibrant displays, are being used in advanced televisions and smartphones. Micro-LEDs, with their potential for higher brightness and energy efficiency, are expected to revolutionize display technology. As LED technology continues to evolve, it will play a crucial role in addressing global challenges related to energy consumption and sustainability.

Due to its numerous advantages, LED technology is rapidly replacing traditional light sources such as incandescent and fluorescent bulbs. One of the key features driving this replacement is energy efficiency. LEDs use significantly less electricity to produce the same amount of light as traditional bulbs, which translates to substantial energy savings. This efficiency is particularly important in large-scale applications, such as street lighting and commercial buildings, where the cumulative energy savings can be immense. Additionally, LEDs generate very little heat compared to incandescent bulbs, which convert much of their energy into heat rather than light. This not only makes LEDs safer and cooler to touch but also reduces the load on air conditioning systems, leading to further energy savings.

Another crucial feature of LED technology is its long lifespan. LEDs can last up to 25 times longer than traditional incandescent bulbs and about three to five times longer than compact fluorescent lamps (CFLs). This extended lifespan significantly reduces maintenance costs and the frequency of replacements. For businesses and municipalities, this means fewer disruptions and lower labor costs associated with changing bulbs. In residential settings, it translates to convenience and cost savings for homeowners. The long life of LEDs also contributes to environmental sustainability by reducing the number of bulbs that end up in landfills.

LEDs offer unparalleled versatility and design flexibility, which has expanded their use in a wide variety of lighting devices. Their small size and ability to be integrated into compact and innovative designs make them ideal for applications where traditional bulbs would be impractical. For example, LEDs are extensively used in automotive lighting, including headlights, tail lights, and interior lights, due to their durability, energy efficiency, and ability to produce bright, focused light. In the entertainment industry, LEDs are used in stage lighting, displays, and screens, offering vibrant colors and dynamic lighting effects that enhance performances and visual experiences.

In the realm of smart lighting, LEDs are a natural fit due to their compatibility with digital controls. Smart LED bulbs can be controlled remotely via smartphones or integrated into smart home systems, allowing users to adjust brightness, color, and timing according to their preferences. This capability not only adds convenience and customization but also contributes to energy efficiency through features like automatic dimming and motion detection. Moreover, the ability to control LED lighting remotely and programmatically makes them ideal for applications in smart cities, where streetlights and public lighting can be managed centrally to optimize energy use and maintenance schedules.

The environmental benefits of LED technology extend beyond energy efficiency and long lifespan. LEDs are free of hazardous materials such as mercury, which is present in fluorescent bulbs, making them safer for both users and the environment. Their reduced energy consumption means lower greenhouse gas emissions from power plants, contributing to efforts to combat climate change. Additionally, the development of recycling programs specifically for LEDs is making it easier to dispose of them responsibly, further minimizing their environmental impact.

Overall, the features of LED technology-energy efficiency, long lifespan, versatility, and environmental friendliness—have made them the preferred choice for a wide range of lighting applications. From residential homes to commercial buildings, public infrastructure to personal devices, LEDs are becoming ubiquitous. As technology continues to advance, the integration of LEDs into various lighting devices and systems will only increase, driving further innovations and benefits. This widespread adoption of LED technology marks a significant shift in the lighting industry, promising a more sustainable and efficient future.

LED panel lights have become increasingly popular in a variety of settings, including restaurants, living rooms, and commercial environments, due to their ability to provide soft, even lighting. These fixtures consist of an array of LEDs mounted on a flat panel that diffuses the light, creating a smooth and uniform glow that reduces glare and shadows. This quality of light is particularly desirable in spaces where comfort and ambiance are important, such as dining areas and living spaces. In commercial environments, the consistent and high-quality light from LED panels enhances visibility and productivity while maintaining a pleasing aesthetic.

One of the standout features of LED panel lights is their sleek, low-profile design, which allows them to be seamlessly integrated into ceilings and walls. This modern look is not only visually appealing but also saves space and makes the fixtures less obtrusive. The slim design of LED panel lights is ideal for environments with low ceilings or where a minimalist appearance is desired. Additionally, these lights often come in various shapes and sizes, offering flexibility in design and installation to suit different architectural styles and spatial requirements.

Despite the advantages of LED panel lights, there is a growing demand for even more flexible configurations to meet diverse lighting needs. People are increasingly looking for lighting solutions that can be customized and adjusted to fit their specific preferences and requirements. This has led to the development of panel lights with adjustable color temperatures and brightness levels. By incorporating tunable white technology, users can change the color temperature from warm to cool white, adapting the lighting to different activities and times of day. Dimmable options allow for control over light intensity, providing the right amount of light for any setting or mood.

In addition to adjustable lighting, smart technology is playing a significant role in enhancing the flexibility of LED panel lights. Smart panel lights can be controlled via remote controls, smartphone apps, or integrated into smart home systems. This allows users to create and save different lighting scenes, set schedules, and even automate lighting based on occupancy or natural light levels. In commercial environments, smart controls can optimize energy usage and enhance the lighting experience for employees and customers alike. For instance, in a restaurant, different lighting scenes can be programmed for lunch, dinner, and special events, creating the perfect ambiance for each occasion.

Modular designs are another innovation addressing the need for flexible configurations. Modular LED panel lights can be combined and arranged in various patterns to create custom lighting solutions. This adaptability is particularly useful in commercial environments where lighting needs may change over time or vary across different areas of a building. For example, in an office, modular panels can be reconfigured to accommodate changes in layout or function, ensuring that each workspace is optimally lit. Similarly, in retail settings, modular panels can highlight different product displays or create distinct zones within a store.

The continued evolution of LED panel light technology is driven by the desire to provide more personalized and adaptable lighting solutions. As manufacturers respond to consumer demand, we can expect to see further advancements in features such as color rendering, energy efficiency, and user-friendly controls. Innovations like dynamic daylight simulation, which mimics natural light patterns to support human circadian rhythms, and integration with other smart building systems will enhance the functionality and appeal of LED panel lights. By meeting the diverse needs of users in various settings, LED panel lights are set to remain a versatile and essential component of modern lighting design.

The prevalence of light-emitting devices in modern life cannot be overstated. From residential homes to commercial establishments, public infrastructure to personal gadgets, lighting solutions play a critical role in our daily activities and overall well-being. With the widespread adoption of light devices, even a small advancement in their technology or design can lead to significant improvements and widespread impact. These improvements not only enhance the functionality and user experience but also contribute to energy efficiency, cost savings, and environmental sustainability.

Given the extensive use of lighting devices, continuous innovation in this field is crucial. A key area of focus is the flexibility of lighting solutions. Users increasingly demand lighting systems that can be tailored to their specific needs and preferences. This includes the ability to adjust brightness and color temperature, customize lighting scenes, and integrate with smart home systems. Flexible lighting solutions can enhance comfort, productivity, and mood, making them highly desirable in various settings such as homes, offices, and public spaces.

In addition to flexibility, the functional capabilities of lighting devices are paramount. Modern lighting systems are expected to do more than just illuminate a space. They should support various activities, improve safety and security, and contribute to aesthetic appeal. For instance, in commercial environments, lighting can enhance the shopping experience or increase productivity in the workplace. In public spaces, intelligent lighting systems can provide dynamic illumination that responds to environmental conditions and user movement, improving safety and energy efficiency.

Cost is another critical factor in the development of lighting technologies. As lighting devices are ubiquitous, cost-effective solutions can lead to substantial savings for consumers and businesses alike. Advances that reduce the manufacturing and operational costs of lighting systems without compromising performance are highly beneficial. This includes innovations in materials, production processes, and energy consumption. Lower costs can accelerate the adoption of advanced lighting technologies, making them accessible to a broader range of users and applications.

Robustness and durability are essential considerations for lighting devices, especially in demanding environments. Lighting systems must withstand various conditions, including fluctuations in temperature, humidity, and mechanical stress. Enhancing the robustness of lighting devices ensures their longevity and reliability, reducing maintenance costs and minimizing disruptions. This is particularly important for applications in industrial settings, outdoor lighting, and critical infrastructure where consistent performance is crucial.

Ultimately, the pursuit of innovation in lighting technology involves a holistic approach that considers multiple factors: flexibility, functionality, cost, and robustness. By addressing these aspects, new advancements can bring about substantial improvements in human life. Enhanced lighting solutions can provide better quality of life through improved comfort and aesthetics, greater efficiency through reduced energy consumption and costs, and increased safety and productivity. As such, ongoing research and development in this field are not only beneficial but essential to harnessing the full potential of lighting technology to meet the evolving needs of society.

SUMMARY

In some embodiments, a lighting apparatus includes a plastic cover, a trumpet housing and a light source plate.

The plastic cover has an edge portion, a light passing cover and a connection column.

The trumpet housing has a widened section and a neck portion.

A top end of the neck portion is coupled to a bottom end of the widened section.

A diameter of the widened section increases through a tapered transition from the bottom end of the widened section to a top end of the widened section.

The light source plate is mounted with a LED module on a front surface.

The light source plate is fixed to an inner structure of trumpet housing.

The connection column engages the front surface of the light source plate.

The edge portion of the plastic engages the top end of the widen section of the trumpet housing.

In some embodiments, the connection column has a hook passing through a column hole of light source plate to fix the plastic cover to the trumpet housing.

In some embodiments, the hook has an elastic reverse hook structure.

After the reverse hook structure is squeezed passing through the column hole, the elastic reverse hook is released to recover shape and firmly hold a back surface of the light source plate.

In some embodiments, the connection column further has a buckle structure.

The buckle structure engage the front surface of the light source plate and the elastic reverse hook engages the back surface of the light source plate to together lock the connection column to the light source plate.

In some embodiments, an antenna path is placed on the connection column for connecting an embedded antenna disposed to the plastic cover to the light source plate. In some embodiments, the column hole has an antenna electrode for electrically connected to the embedded antenna.

In some embodiments, the plastic cover is rotated after the hook passes through the column hole for lock the hook on a back surface of the light source plate.

In some embodiments, a gear structure is disposed on the light source for providing multiple gear positions for the hook to stay to configure an optical parameter of the LED modules.

In some embodiments, a controller detects the gear position of the hook to determine the optical parameter.

In some embodiments, the multiple gear positions correspond to different color temperatures of a mixed light of the LED module controlled by the controller.

In some embodiments, the plastic cover is fixed to the trumpet housing relying a first engagement between edge portion of the plastic cover and the top end of the widen portion and a second engagement between the hook and a back surface of the light source plate.

In some embodiments, the light passing cover has a inward lens facing to the LED module.

In some embodiments, a portion of the LED module is disposed below the inward lens and another portion of the LED module is disposed outside the inward lens.

In some embodiments, a bottom part of the inward lens engages the light source plate.

In some embodiments, an aligning structure is disposed on the light spruce plate for aligning the inward lens to a required position when installing the plastic cover to the trumpet housing.

In some embodiments, a metal strip is attached on the connection column to pass heat from the light source plate to the plastic cover.

In some embodiments, a bottom end of the neck portion is fixed to an Edison cap.

In some embodiments, the light source plate has a track for inserting a portion of the connection column.

In some embodiments, where the edge portion of the plastic cover is a rubber bellows.

The rubber bellows change a height through a folding side structure.

The edge portion is attached to the trumpet housing.

In some embodiments, a user pushes the connection column into the track for a different distance to change a relative distance between a lens of the plastic to the LED module.

DETAILED DESCRIPTION

Figure 6:
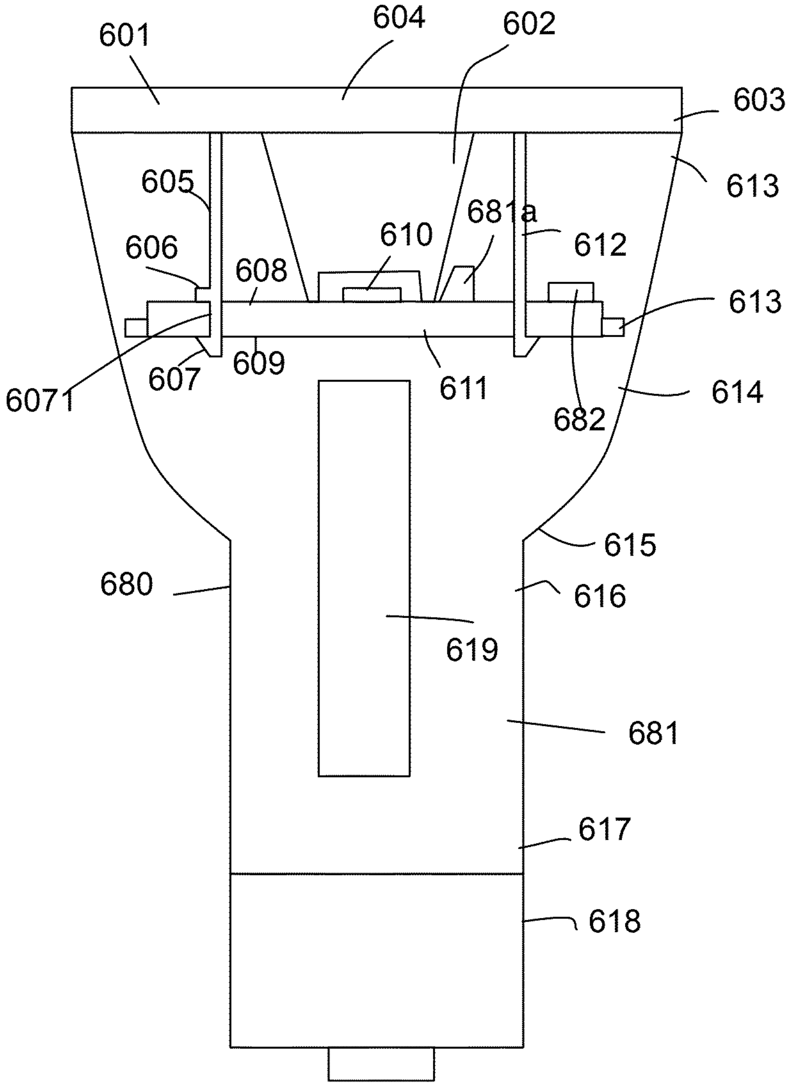
FIG. 6 illustrates another lighting apparatus embodiment.

In FIG. 6, a lighting apparatus includes a plastic cover 601, a trumpet housing 680 and a light source plate 611.

The plastic cover 601 has an edge portion 603, a light passing cover 604 and a connection column 605.

The trumpet housing 680 has a widened section 614 and a neck portion 681.

A top end 616 of the neck portion 681 is coupled to a bottom end 615 of the widened section 614.

A diameter of the widened section 614 increases through a tapered transition from the bottom end 615 of the widened section 614 to a top end 613 of the widened section 614. A light source plate 611 is mounted with a LED module 610 on a front surface 608. The light source plate 611 is fixed to an inner structure 613 of trumpet housing 680. The connection column 605 engages the front surface 608 of the light source plate 611.

The edge portion 603 of the plastic cover 601 engages the top end 613 of the widen section 614 of the trumpet housing 680.

In some embodiments, the connection column 605 has a hook 607 passing through a column hole 6071 of light source plate 611 to fix the plastic cover 601 to the trumpet housing 680.

In some embodiments, the hook 607 has an elastic reverse hook structure.

After the reverse hook structure is squeezed passing through the column hole, the elastic reverse hook is released to recover shape and firmly hold a back surface of the light source plate.

Figure 7A:
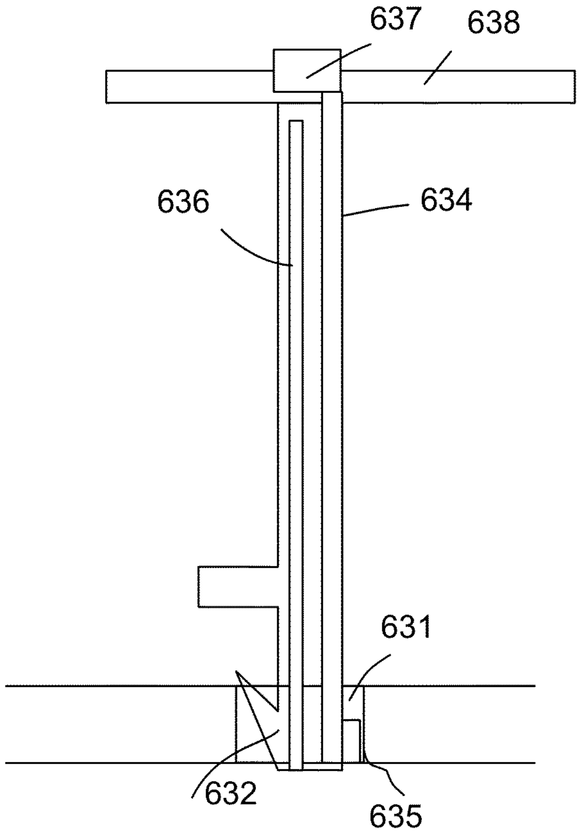
FIG. 7A and FIG. 7B show a connector structure.
Figure 7B:
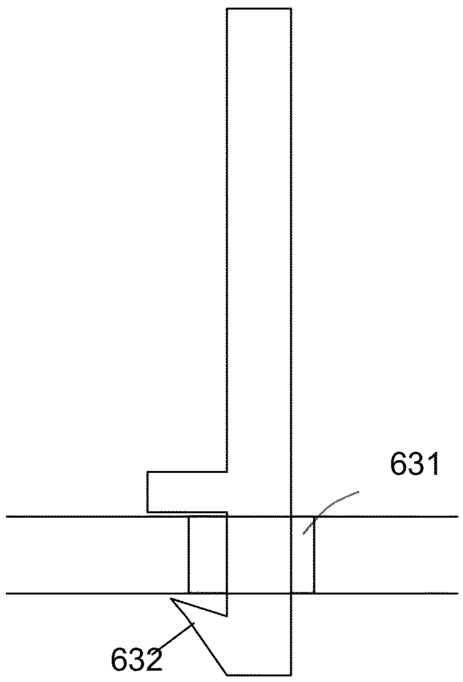

FIG. 7A and FIG. 7B show such elastic reverse hook structure 632. When the elastic reverse hook structure 632 is within the column hole 631, it deforms. But, after the elastic reverse hook structure 632 passes through the column hole 631, it expands as its original shape due to elastic force and lock itself on the back surface of the light source plate.

In FIG. 6, the connection column 605 further has a buckle structure 606.

The buckle structure 606 engages the front surface 608 of the light source plate 611 and the elastic reverse hook engages the back surface of the light source plate to together lock the connection column to the light source plate.

Please note there is another connection column 612 as an example for further stable the connection between the plastic cover to the trumpet housing. In addition, the connection column 612 does not have a buckle structure, but only has a reverse hook. In other words, there are multiple ways to implement the inventive concept.

In FIG. 7A, an antenna path 634 is placed on the connection column for connecting an embedded antenna 637 disposed to the plastic cover 638 to the light source plate. For example, an electronic signal path provides a signal connection between the embedded antenna 637 with a controller that controls the LED module.

In some embodiments, the column hole 631 has an antenna electrode 635 for electrically connected to the embedded antenna 637.

In some embodiments, the plastic cover is rotated after the hook passes through the column hole for lock the hook on a back surface of the light source plate.

Figure 9:
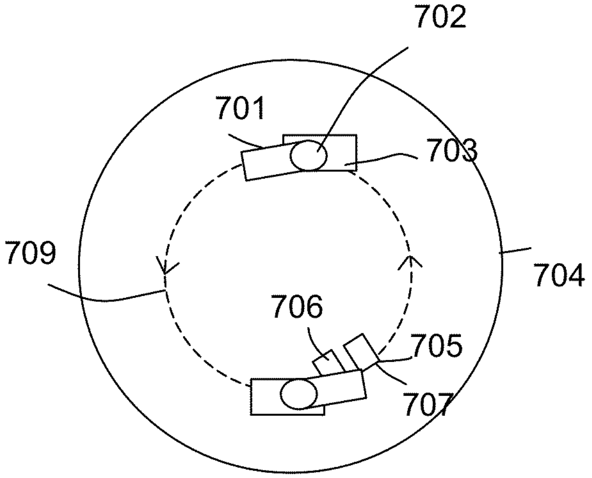
FIG. 9 shows another lighting apparatus embodiment.

FIG. 9 shows such an example. In FIG. 9, which is a top view showing a circular track 709 for the connection column 702 to move. When the hook 701 passes through the column hole 703 and move on the back side of the light source plate, it forms a lock structure to keep the plastic cover to fix to the trumpet housing.

In some embodiments, a gear structure 705 is disposed on the light source for providing multiple gear positions 70 for the hook to stay to configure an optical parameter of the LED modules. For example, when the hook engages the gear structure 706, it forms a first resistance that is detected by a controller to provide a first type of driving current to the LED module. When the hook engages the gear position 705, it forms another resistance value corresponding to another optical parameter.

In some embodiments, a controller detects the gear position of the hook to determine the optical parameter. FIG. 6 shows a controller 619 that converts an external power source to a driving current to the LED module 610. By changing the driving current, the controller may use the LED module to emit different mixed light parameter.

In some embodiments, the multiple gear positions correspond to different color temperatures of a mixed light of the LED module controlled by the controller.

In some embodiments, the plastic cover is fixed to the trumpet housing relying a first engagement between edge portion of the plastic cover and the top end of the widen portion and a second engagement between the hook and a back surface of the light source plate. FIG. 6 shows such example as well as FIG. 1 to FIG. 5.

In FIG. 6, the light passing cover 601 has an inward lens 602 facing to the LED module 610.

In some embodiments, a portion of the LED module is disposed below the inward lens and another portion of the LED module is disposed outside the inward lens. For example, there is another LED module 612 disposed on the light source plate 611 not covered by the lens 602.

In some embodiments, a bottom part of the inward lens 602 engages the light source plate 611.

In some embodiments, an aligning structure 681*a* is disposed on the light spruce plate 611 for aligning the inward lens 602 to a required position when installing the plastic cover 601 to the trumpet housing 680.

In FIG. 7A, a metal strip 636 is attached on the connection column to pass heat from the light source plate to the plastic cover. If the connection column is made a thermal conductive material, the metal strip may not be necessary, but the metal strip may enhance a better heat dissipation. In addition, the metal strip may also serves as a conductive path for connecting electronic device like an antenna.

In FIG. 6, a bottom end 617 of the neck portion is fixed to an Edison cap 618.

Figure 8:
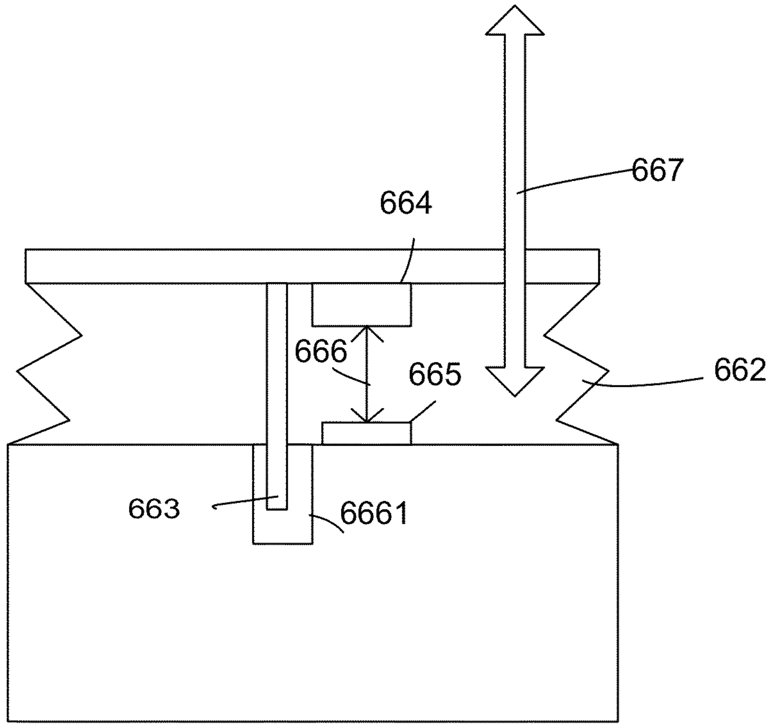
FIG. 8 shows another lighting apparatus embodiment.

In FIG. 8, the light source plate has a track 6661 for inserting a portion 663 of the connection column.

In some embodiments, where the edge portion of the plastic cover is a rubber bellows 662.

The rubber bellows 662 changes a height through a folding side structure.

The edge portion is attached to the trumpet housing.

In some embodiments, a user pushes the connection column into the track for a different distance 666 to change a relative distance between a lens 664 of the plastic to the LED module 665.

Figure 1:
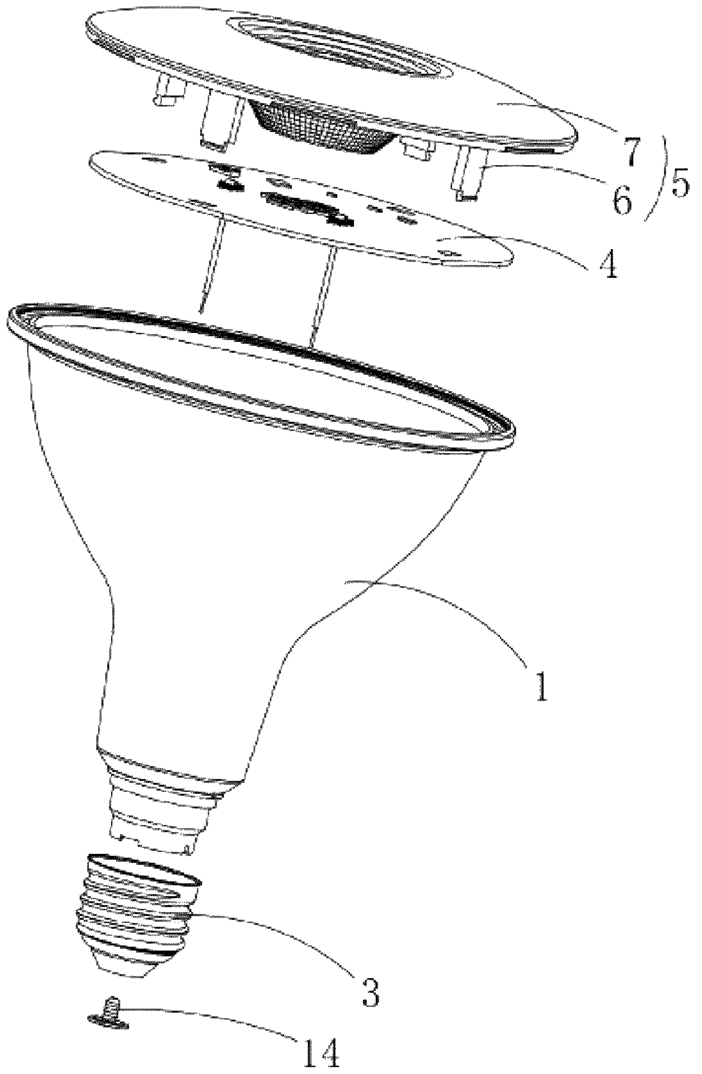
FIG. 1 illustrates an exploded view of a lighting apparatus embodiment.
Figure 2:
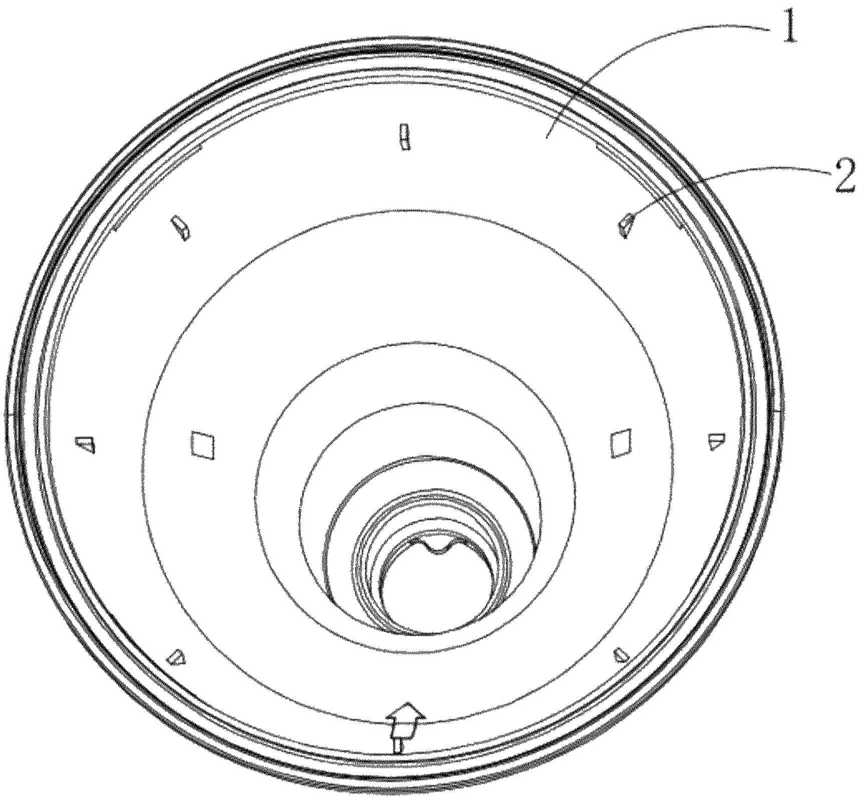
FIG. 2 illustrates an example of a trumpet housing.
Figure 3:
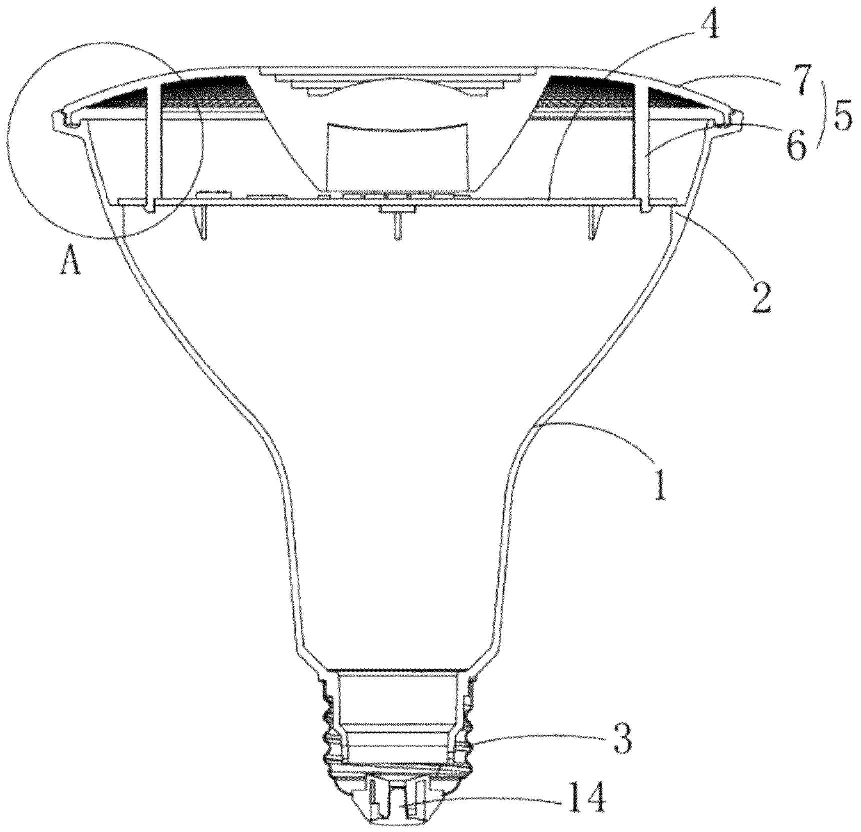
FIG. 3 illustrates a cross section view of the embodiment in FIG. 1.

Referring to FIG. 1, FIG. 2, and FIG. 3, this application provides a screw-free PAR lamp, which includes a sleeve 1, a lamp base 3, a light source assembly, and a lens assembly 5.

In this embodiment, the interior of the sleeve 1 is provided with a limiting portion 2. One end of the sleeve 1 has a smaller diameter, and the other end has a larger diameter.

The lamp base 3 is connected to the smaller diameter end of the sleeve 1.

The light source assembly is arranged inside the sleeve 1, and the light source assembly abuts the limiting portion 2 inside the sleeve 1.

The lens assembly 5 is snap-fitted to the larger diameter end of the sleeve 1. The lens assembly 5 also functions to push the light source assembly, positioning it at the limiting portion 2.

Traditional PAR lamps are connected using multiple screws, specifically including a screw connection between the sleeve 1 and the lens assembly 5, as well as between the light source assembly and the sleeve 1. In some cases, even the light source assembly and the lens assembly 5 are connected by screws.

In contrast, in this embodiment, the lens assembly 5 and the sleeve 1 of the PAR lamp are connected by snap-fitting, while the light source assembly is simultaneously positioned and held in place by both the lens assembly 5 and the sleeve 1, eliminating the need for screws and making the operation simpler and more convenient.

Specifically, the interior wall of the sleeve 1 is provided with the limiting portion 2, where the light source assembly is placed inside the sleeve 1 to abut the limiting portion 2, achieving positioning of the light source assembly. However, at this stage, the light source assembly is not yet fixed; it needs to be pushed by the lens assembly 5 to be secured at the limiting portion 2.

When the lens assembly 5 is snap-fitted to the larger diameter end of the sleeve 1, it simultaneously pushes the light source assembly into the limiting portion 2, securing the light source assembly in place, while the lens assembly 5 is also securely snap-fitted to the sleeve 1.

The sleeve 1 is a cylindrical structure with a gradually varying diameter, featuring a hollow interior and open ends. The larger diameter end is used for snap-fitting the lens assembly 5, and the smaller diameter end is used for connecting the lamp base 3.

The sleeve 1 can be made of a metal heat sink material, providing excellent heat dissipation.

As shown in FIG. 3, in a preferred embodiment provided by this application, the light source assembly includes a PCB board 4 and components arranged on the PCB board 4. The PCB board 4 is coaxially arranged with the sleeve 1 and is perpendicular to the axis of the sleeve 1, with the PCB board 4 abutting the limiting portion 2.

The light source assembly includes the PCB board 4, on which various components, such as LED chips, are mounted. The cross-section of the sleeve 1 can be circular. Therefore, the matching PCB board 4 can also be circular. For optimal assembly, the PCB board 4 can be coaxially aligned with the sleeve 1, meaning the axis of the sleeve 1 passes through the center of the PCB board 4, and the PCB board 4 is perpendicular to the axis of the sleeve 1. This arrangement ensures proper assembly and uniform light emission.

The advantage of this embodiment lies in the contact between the PCB board 4 and the limiting portion 2, resulting in a simple and well-aligned structure.

Alternatively, the PCB board 4 can be shaped differently, specifically adapted to the distribution of the limiting portion 2.

For instance, the PCB board 4 could be rectangular, with its four corners fitting against the limiting portion 2. Alternatively, the PCB board 4 could be triangular, with its three corners fitting against the limiting portion 2.

Furthermore, the PCB board 4 may include recesses, such as slot-shaped grooves, that snap into the limiting portion 2. Alternatively, the limiting portion 2 may include a flat supporting surface that abuts the lower surface of the PCB board 4.

The sleeve 1 is a cylindrical structure with a central axis.

As shown in FIG. 2, in a preferred embodiment provided by this application, the limiting portion 2 can be one or more of the following: a protrusion, rib, boss, lug, protruding plate, bump, groove, or recessed platform on the inner wall of the sleeve 1.

Specifically, the form of the limiting portion 2 can vary, and any structure that protrudes from or is recessed into the inner wall of the sleeve 1, creating a non-planar surface, falls within the scope of this application.

When the inner wall of the sleeve 1 has a non-planar surface, the light source assembly can abut this structure.

Thus, in this embodiment, the limiting portion 2 can be one or more of the following: a protrusion, rib, boss, lug, protruding plate, bump, groove, or recessed platform.

If the limiting portion 2 is a protrusion, it could be a block with a triangular cross-section, attached to the inner wall, with a flat surface for supporting the light source assembly.

Alternatively, the limiting portion 2 could be a rib. If it is a rib, it could have a circular cross-section and extend along an arc, with the curvature matching that of the inner wall of the sleeve 1, and it would be connected to the inner wall of the sleeve 1. The upper surface of the rib would be used to support the light source assembly.

Alternatively, the limiting portion 2 could be a boss, which might be an annular structure that forms a step on the inner wall of the sleeve 1, designed to support the light source assembly.

Alternatively, the limiting portion 2 could be a groove or recessed platform, a structure recessed into the inner wall of the sleeve 1, into which the light source assembly can snap. In this case, the recessed structure could be an annular groove surrounding the inner wall of the sleeve 1.

The limiting portion 2 may be made of insulating material, or it may be made of a heat-insulating material.

Thus, this embodiment provides a specific structural form of the limiting portion 2, which can effectively support the light source assembly and can be adapted to the specific structure of the sleeve 1.

As shown in FIG. 2, further, the limiting portion 2 can be arranged such that it is evenly spaced along the circumferential direction of the sleeve 1, with the limiting portion 2 having a contact surface for abutting the light source assembly.

Since the cross-section of the sleeve 1 is circular, this embodiment provides that the limiting portion 2 is evenly distributed along the circumferential direction of the circle. This arrangement allows the light source assembly to be stably supported across the entire circular surface, ensuring uniform force distribution.

Specifically, the limiting portion 2 should be greater than or equal to two, and preferably three or four.

Figure 4:
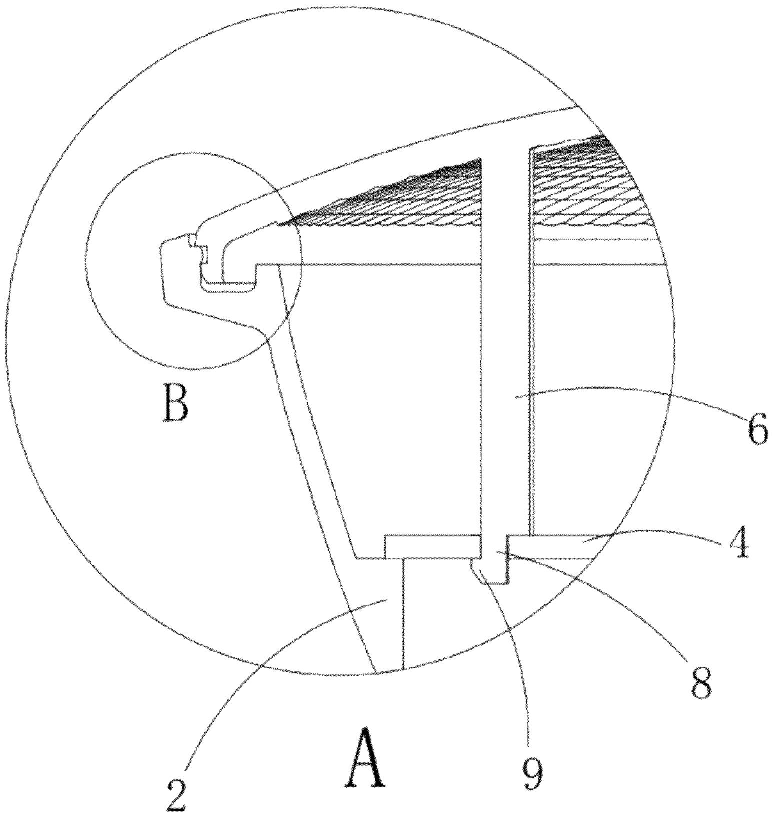
FIG. 4 illustrates a zoom-up view of a connection between a plastic cover and a trumpet housing.

As shown in FIG. 3 and FIG. 4, in a preferred embodiment provided by this application, the lens assembly 5 includes a push rod 6, which is used to push the light source assembly.

Specifically, the lens assembly 5 includes a lens body 7 and the push rod 6, with the push rod 6 connected to the lens body 7. The push rod 6 can be an insulating rod, such as a plastic rod.

The push rod 6 is connected to the recessed side of the lens body 7 facing the sleeve 1 and may include multiple push rods 6.

When the lens body 7 is mounted on the sleeve 1, the push rod 6 abuts the light source assembly, pressing it and positioning the light source assembly at the limiting portion 2. This not only positions the lens assembly 5 but also the light source assembly.

This embodiment uses the push rod 6 to push the light source assembly. Due to the length of the push rod 6, it can effectively press the light source assembly, making the operation simple and convenient.

In a preferred embodiment of the light source assembly provided by this application, the light source assembly includes the PCB board 4, which abuts the limiting portion 2. The PCB board 4 has through holes, and the end surface of the push rod 6 is provided with an insertion portion that is inserted into the through hole. The end surface of the push rod 6 abuts the top surface of the PCB board 4.

Specifically, the push rod 6 can directly push the PCB board 4.

In this embodiment, through holes are provided on the PCB board 4, allowing the insertion portion of the push rod 6 to be inserted into the through holes. This prevents the PCB board 4 from wobbling in the direction perpendicular to the axis of the sleeve 1. Once inserted, the end surface of the push rod 6 can abut the upper surface of the PCB board 4. Because the cross-section of the insertion portion is smaller than the area of the end surface of the push rod 6, the portion of the end surface without the insertion portion can press against the upper surface of the PCB board 4, pressing it against the limiting portion 2.

The effect of this embodiment is to prevent the PCB board 4 from wobbling in the direction perpendicular to the axis of the sleeve 1 and to prevent the PCB board 4 from wobbling in the direction of the axis of the sleeve 1 by pressing the PCB board 4 with the end surface.

As shown in FIG. 4, further, the insertion portion includes an insertion plate 8 and barbs 9 on the side surface of the insertion plate 8. The insertion plate 8 is inserted into the through hole, with the barbs 9 passing through the through hole and snapping onto the bottom surface of the PCB board 4.

This embodiment also provides that the insertion portion includes the insertion plate 8, with the cross-section of the insertion plate 8 matching that of the through hole. The barbs 9 can pass through the through hole, and after passing through, the barbs 9 can hook onto the bottom surface of the PCB board 4, enhancing the stability of the connection.

It can be arranged such that the barbs 9 deform slightly when passing through the through hole and then return to their original shape, providing a better snap-fit effect.

As shown in FIG. 4, in a preferred embodiment provided by this application, the lens assembly 5 includes the lens body 7, and the edge of the lens body 7 is provided with a first snap-fit portion, while the larger diameter end of the sleeve 1 is provided with a second snap-fit portion. The first snap-fit portion and the second snap-fit portion engage with each other.

Specifically, the lens body 7 has a circular structure, and the sleeve 1 has a circular cross-section. The diameter of the lens body 7 matches the diameter of the larger diameter end of the sleeve 1, allowing them to be snap-fitted through the first snap-fit portion and the second snap-fit portion, achieving a detachable connection and avoiding the need for screw connections.

Figure 5:
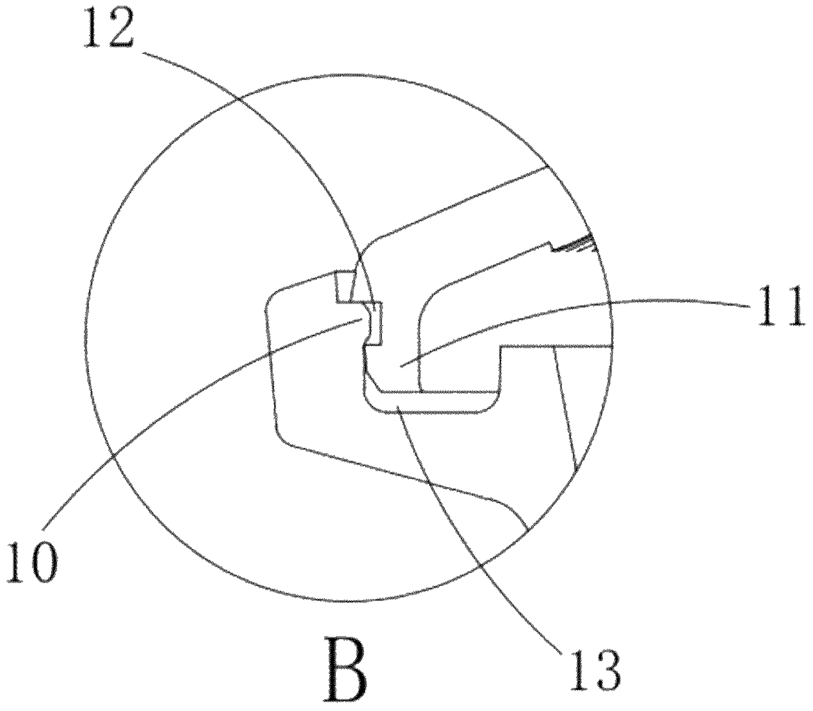
FIG. 5 illustrates a zoom-up view of an area of FIG. 4.

As shown in FIG. 5, further, this embodiment provides the specific structural forms of the first snap-fit portion and the second snap-fit portion. The second snap-fit portion includes an annular groove 13 and an annular ridge 10 on the side of the groove 13. The first snap-fit portion includes an annular block 11 and an annular groove 12 on the side of the block 11. The block 11 is inserted into the groove 13, and the ridge 10 snaps into the groove 12.

Specifically, the larger diameter end of the lens body 7 and the sleeve 1 are aligned, and then the block 11 is inserted into the groove 13, while the ridge 10 enters the groove 12, achieving the snap-fit.

The insertion direction of the block 11 into the groove 13 is perpendicular to the insertion direction of the ridge 10 into the groove 12. This means that if the block 11 is pulled out of the groove 13, the ridge 10 located in the groove 12 will block the block 11 from being pulled out, thereby achieving the snap-fit.

Therefore, the snap-fit form provided by this embodiment is reasonable in assembly, simple in operation, and effectively achieves the snap-fit connection between the two components.

The screw-free PAR lamp provided by this embodiment also includes a pin 14, which is mounted at the end of the lamp base 3 to seal the end of the lamp base 3.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a plastic cover with an edge portion, a light passing cover and a connection column;

a trumpet housing with a widened section and a neck portion, wherein a top end of the neck portion is coupled to a bottom end of the widened section, wherein a diameter of the widened section increases through a tapered transition from the bottom end of the widened section to a top end of the widened section; and a light source plate, mounted with an LED module on a front surface, wherein the light source plate is fixed to an inner structure of trumpet housing, wherein the connection column engages the front surface of the light source plate, wherein the edge portion of the plastic cover engages the top end of the widen section of the trumpet housing, wherein the connection column has a hook passing through a column hole of light source plate to fix the plastic cover to the trumpet housing, wherein the plastic cover is rotated after the hook passes through the column hole for lock the hook on a back surface of the light source plate, wherein a gear structure is disposed on the light source for providing multiple gear positions for the hook to stay to configure an optical parameter of the LED modules.

2. The lighting apparatus of claim 1, wherein the hook has an elastic reverse hook structure, wherein after the reverse hook structure is squeezed passing through the column hole, the elastic reverse hook is released to recover shape and firmly hold a back surface of the light source plate.

3. The lighting apparatus of claim 2, wherein the connection column further has a buckle structure, wherein the buckle structure engage the front surface of the light source plate and the elastic reverse hook engages the back surface of the light source plate to together lock the connection column to the light source plate.

4. The lighting apparatus of claim 1, wherein an antenna path is placed on the connection column for connecting an embedded antenna disposed to the plastic cover to the light source plate.

5. The lighting apparatus of claim 4, wherein the column hole has an antenna electrode for electrically connected to the embedded antenna.

6. The lighting apparatus of claim 1, wherein a controller detects the gear position of the hook to determine the optical parameter.

7. The lighting apparatus of claim 6, wherein the multiple gear positions correspond to different color temperatures of a mixed light of the LED module controlled by the controller.

8. The lighting apparatus of claim 1, wherein the plastic cover is fixed to the trumpet housing relying a first engagement between edge portion of the plastic cover and the top end of the widen portion and a second engagement between the hook and a back surface of the light source plate.

9. The lighting apparatus of claim 1, wherein the light passing cover has an inward lens facing to the LED module.

10. The lighting apparatus of claim 9, wherein a portion of the LED module is disposed below the inward lens and another portion of the LED module is disposed outside the inward lens.

11. The lighting apparatus of claim 9, wherein a bottom part of the inward lens engages the light source plate.

12. The lighting apparatus of claim 11, wherein an aligning structure is disposed on the light spruce plate for aligning the inward lens to a required position when installing the plastic cover to the trumpet housing.

13. The lighting apparatus of claim 1, wherein a metal strip is attached on the connection column to pass heat from the light source plate to the plastic cover.

14. The lighting apparatus of claim 1, wherein a bottom end of the neck portion is fixed to an Edison cap.

15. The lighting apparatus of claim 1, wherein the light source plate has a track for inserting a portion of the connection column.

16. The lighting apparatus of claim 15, where the edge portion of the plastic cover is a rubber bellows, wherein the rubber bellows change a height through a folding side structure, wherein the edge portion is attached to the trumpet housing.

17. The lighting apparatus of claim 16, wherein a user pushes the connection column into the track for a different distance to change a relative distance between a lens of the plastic to the LED module.

* * * * *